United States Patent [19]
Herbermann et al.

[11] Patent Number: 5,697,480
[45] Date of Patent: Dec. 16, 1997

[54] BREAKAWAY MOUNT FOR ROBOT ARM

[75] Inventors: Alfred F. Herbermann; Michael A. Filipiak, both of Ann Arbor, Mich.

[73] Assignee: Syron Engineering & Manufacturing Corporation, Saline, Mich.

[21] Appl. No.: 408,358

[22] Filed: Mar. 22, 1995

[51] Int. Cl.⁶ ..................................... B25J 19/00
[52] U.S. Cl. .................. 192/56.32; 192/150; 403/96; 901/13; 901/29; 901/49
[58] Field of Search ................ 192/56.32, 150; 901/29, 49, 46, 41, 13; 403/2, 41, 92, 93, 96

[56] References Cited

U.S. PATENT DOCUMENTS

| | | | |
|---|---|---|---|
| 3,212,740 | 10/1965 | Greenberg | 403/96 X |
| 4,344,729 | 8/1982 | Orsinger et al. | 901/41 X |
| 4,514,616 | 4/1985 | Warner | 901/49 X |
| 4,620,831 | 11/1986 | Poncet et al. | 901/49 X |
| 4,661,038 | 4/1987 | Kohler et al. | 901/49 X |
| 4,673,329 | 6/1987 | Kato | 901/49 X |
| 4,702,667 | 10/1987 | Hounsfield et al. | 901/49 X |
| 4,759,686 | 7/1988 | Kirst | 901/49 X |
| 5,002,173 | 3/1991 | Hucul et al. | 192/150 |
| 5,361,881 | 11/1994 | Simond | 192/150 |
| 5,484,219 | 1/1996 | Drew et al. | 403/41 X |

Primary Examiner—Charles A. Marmor
Assistant Examiner—Saul J. Rodriguez
Attorney, Agent, or Firm—Howard & Howard

[57] ABSTRACT

A breakaway connection for securely mounting a tool to a robot is disclosed. The breakaway connection incorporates a plunger that is spring biased from a moving member into a notch in a fixed member. Moment arm forces on the tool are translated to the connection between the plunger and the notch. Should those overload forces exceed the spring force on the plunger, the plunger moves out of the notch. At that time, the tool is free to pivot relative to the housing to a disabled position. This pivoting movement allows the tool to move away from an obstruction that might have caused the force. A universal joint connection is used between the moving member and its housing. The spring force on the plunger may be adjusted. In addition, a sensor may monitor movement of the plunger and communicate with a control for the robot to allow the robot to identify when the plunger begins to move. In other features, additional structure may be incorporated with the breakaway connection to resist an axial force directly into the tool. Several embodiments of the axial force resistance structure are disclosed. In some embodiments, a spring provides a resistance force, and in one embodiment, a breakaway connection is provided relative to an axial force.

16 Claims, 4 Drawing Sheets

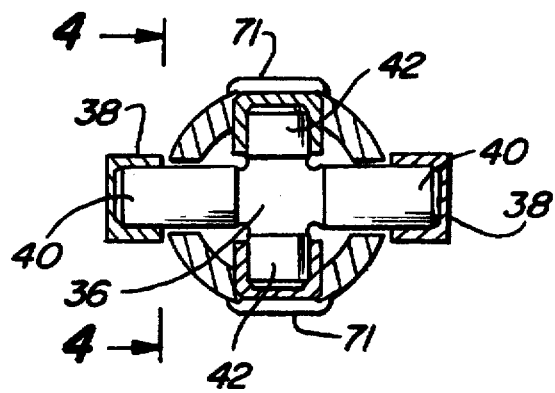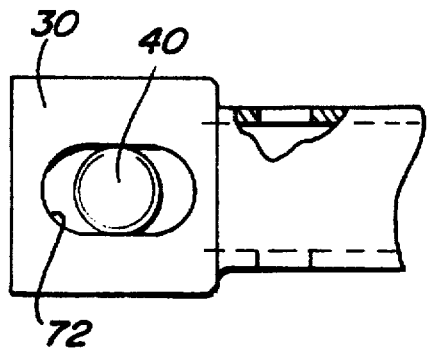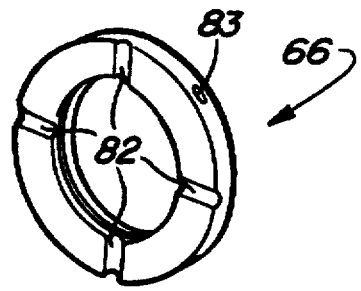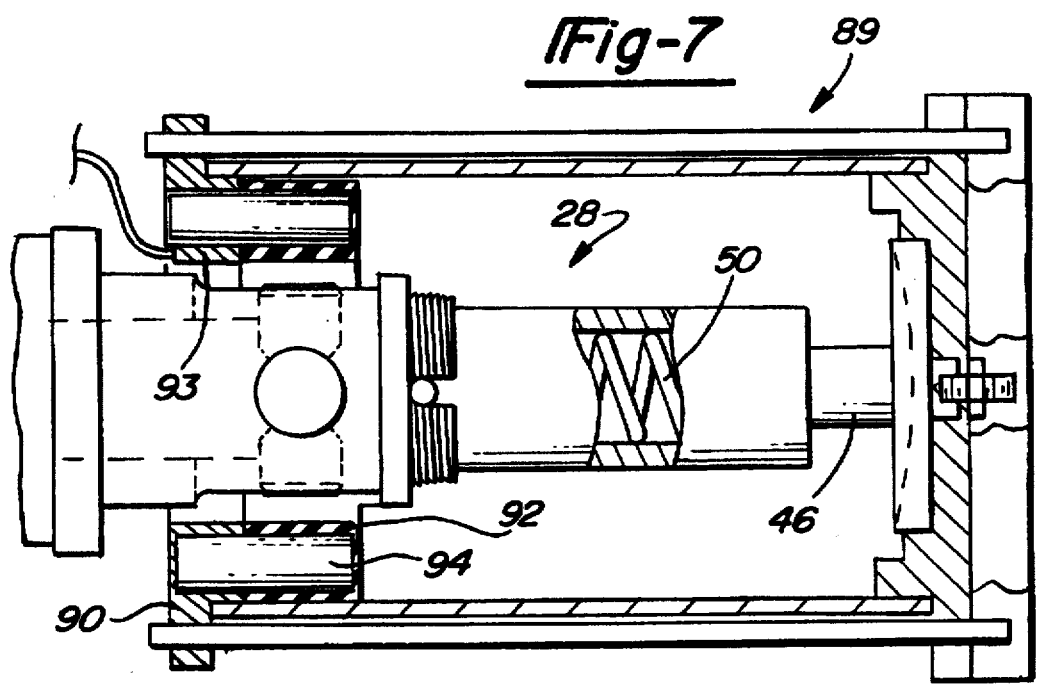

BREAKAWAY MOUNT FOR ROBOT ARM

BACKGROUND OF THE INVENTION

This application relates to a coupling that allows a robot mounted tool to move to a disabled position when it contacts an obstruction.

Robots are performing more and more functions in modern industrial facilities. The term "movement member" is utilized in the context of this patent application to refer to robots or to any system that moves any type of tool through a particular movement to place the tool adjacent to an area where work is to be performed.

In general, tools are mounted to robots which move the tools through predetermined movements to place the tool adjacent to a workpiece. The tool may also be utilized to move a workpiece to a work location. In that instance, the tool mounted on a robot would be a work holder of some sort. Although modern robots are provided with accurate guidance controls, occasionally the tool, or a workpiece carried by the tool may still sometimes be brought into contact with an obstruction.

This problem typically occurs in installations where a robot operates adjacent to other robots performing different functions, or adjacent to other machines having moving parts. If the tool or workpiece is brought into contact with an obstruction, there has sometimes been damage to the robot, the tool, or to the element that is causing the obstruction. Not only is a portion of the system sometimes damaged, there is also significant down time to the assembly function as the broken part is repaired. Obviously, this is undesirable.

SUMMARY OF THE INVENTION

In a disclosed embodiment of this invention, a moving tool is connected to a movement member through a breakaway connection. The breakaway connection provides a secure mount for the tool, but allows the tool to break away from an obstruction to a disabled position if an overload force is reached. Preferably, the breakaway connection is easily reset such that downtime for the system is minimized.

The breakaway connection preferably allows the moving tool to move universally away from an obstruction. In a preferred embodiment, a universal joint is incorporated to mount the tool. In a further preferred feature, an axial force directly into the tool holding arm will also be resisted by the inventive breakaway connection. Additionally, a sensor is preferably mounted into the breakaway connection and monitors movement of the breakaway connection members. If the sensor senses that the connection is beginning to break away, a control signal is sent to the robot stopping further movement. In this way, the contact between the tool and the obstruction is minimized.

In other features of this invention, the breakaway connection incorporates a moving member which is mounted to the tool. The moving member is received within a breakaway housing through a universal joint connection. The moving member carries a spring biased plunger that is biased into a notch in a rear face of the housing to provide a secure connection. The surface of the housing surrounding the notch is generally spherical. A moment arm force on the tool remote from the connection will create a force on the plunger tending to bias it out of the notch. When this force overcomes the force of the spring, the plunger moves out of the notch and along the spherical surface of the housing. The tool may then pivot away from the obstruction to a disabled position.

In other preferred features of this invention, a sensor is mounted in the notch to sense movement of the plunger away from the notch. As noted above, the sensor is connected to appropriate controls for the movement member.

In other features, the spring force is adjustable. In one disclosed embodiment, a ring is mounted on the moving member and may be turned to move a compression member to compress the spring, increasing or decreasing the spring force. Preferably, the ring has a plurality of incrementally spaced nibs, and the moving spring compression member is a bar which may be received in any pair of the nibs. In this way, an operator may make incremental adjustments in the spring force.

As discussed above, in a preferred embodiment the breakaway connection incorporates a universal joint. The universal joint may be similar to that typically used in vehicles, and may include a standard four trunnion cross member. Two of the trunnions are preferably mounted within the non-moving housing, while the other two trunnions are mounted within the moving member, but allowing rotation of the moving member about those trunnions. The trunnions mounted in the housing preferably extend through slots in the moving member such that the cross-member may move with the moving member when pivoting occurs about the trunnions mounted within the moving member.

In other features of this invention, the overload connection also resists a force directly axially into the tool. Several embodiments for achieving this function are disclosed. Sensors are preferably incorporated into these embodiments and communicate with the system control. In a first embodiment, a separate moving housing member is disposed on pins relative to an outer fixed housing member. The separate moving housing member carries the cross member trunnions as described above. The same spring force that holds the plunger in the notch also creates a force tending to resist movement of the moving member and trunnion carrying housing member axially away from the axial force. This separate housing is capable of some axial movement along the pins in response to such a force.

In a second embodiment, a separate axial force breakaway coupling is mounted between the tool and the breakaway connection described above. A disclosed axial force breakaway connection includes a pair of telescoping housing members with plungers spring biased into notches similar to that described with regard to the moment breakaway connection structure. An axial force may overcome these spring forces on the plungers and allow the telescoping members to telescope into each other. The tool may then move away from the obstruction causing the axial force. In this embodiment, the axial force causes a breakaway connection to allow the tool to move away from the obstruction to a disabled position, and remain away from the obstruction until reset. In this embodiment also, it is envisioned that sensors may be utilized.

In a third embodiment, an entire separate housing surrounds the housing mounting the moment arm breakaway connection as described above. This second housing includes separate springs biasing the moment arm breakaway housing to a fixed position. In response to an axial force, the moment arm breakaway housing will compress that spring and move away from the obstruction.

These and other features of the present invention can be best understood from the following specification and drawings, the following of which is a brief description.

BRIEF DESCRIPTION OF THE DRAWINGS

FIG. 3 is a cross-sectional view along line 3—3 as shown in FIG. 2.

FIG. 4 is a side view of a portion of the structure shown in FIG. 3, generally along line 4—4, as shown in FIG. 3.

FIG. 6 is a view of an adjustment member according to the present invention.

FIG. 7 is a view of a first embodiment allowing for axial movement.

DETAILED DESCRIPTION OF A PREFERRED EMBODIMENT

Figure 1:
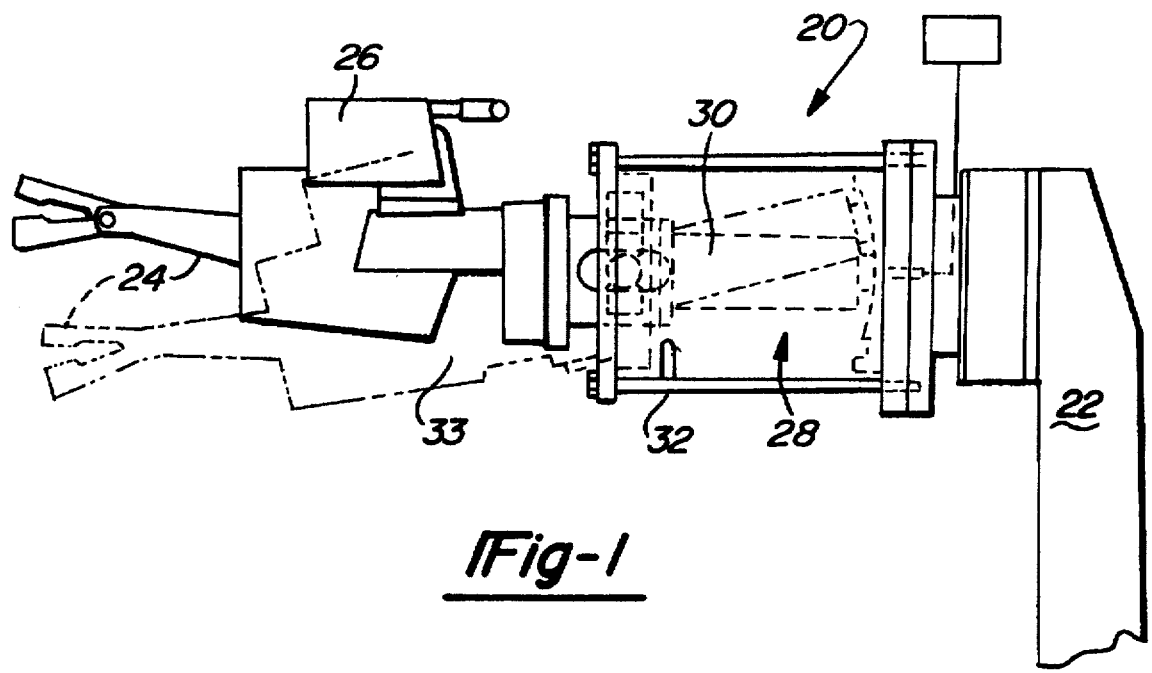
FIG. 1 is a view of a system incorporating the inventive breakaway connection.

As shown in FIG. 1, a system 20 incorporates a movement member 22, which could be a standard robot. A tool 24 is mounted remotely from movement member 22, and typically holds a tool for performing work on a workpiece. The movement member 22 moves the tool 24 as required. The tool might be a tool for performing work such as drilling, welding, etc. on a workpiece, or could be a holding tool for holding and moving a workpiece. A mount member 26 may be used for holding the arm which mounts the tool 24. Mount member 26 could be of the type generally shown in U.S. Pat. No. 5,284,366, owned by the assignee of this invention. A breakaway connection 28 is mounted between mount 26 and movement member 22. As will be explained further below, breakaway connection 28 includes a moving member 30 that is fixed to move with the tool 24, and an outer housing 32 that is fixed to move with the movement member 22. Breakaway connection 28 allows the tool 24 to break away from its secure mount to the movement member 22 and move away from an obstruction to a disabled position 33.

Figure 2:
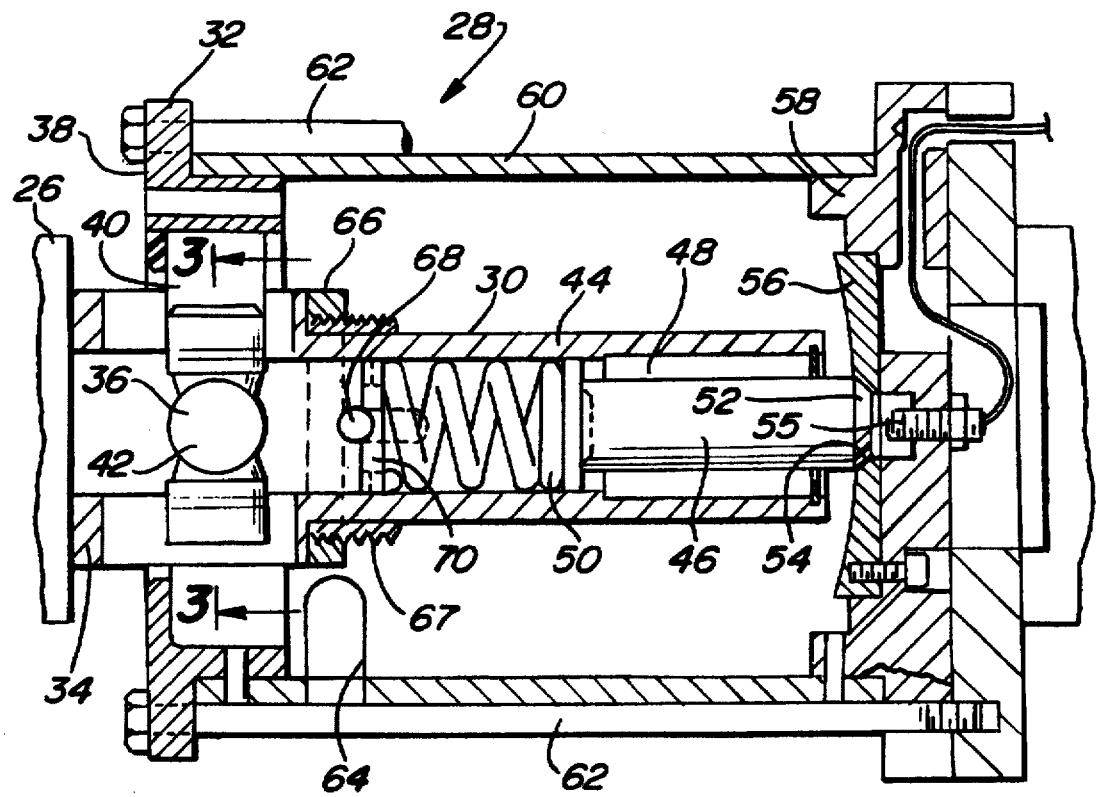
FIG. 2 is a detailed cross-sectional view of the moment arm breakaway connection of the present invention.

As shown in FIG. 2, breakaway connection 28 incorporates a moving portion 30 having a forward end 34 fixed to the mount member 26. A universal joint cross member 36 incorporates four trunnions. The universal joint provided by the cross member 36 is essentially similar to that typically used in vehicles. A fixed housing member 38 receives two trunnions 40 of the cross member 36, and the other two trunnions 42 of the cross member 36 are received in the forward end 34 of the moving member 30. There may be relative pivoting between the housing member 38 and the moving member 30 on either of the trunnions 40 or 42. As will be explained further below, these pivot axes allow the tool mount 26 to move in any angular direction relative to the fixed housing 32 should a sufficient overload force be placed on the tool 24.

To facilitate the breakaway connection, a rear extension 44 of the moving member 30 houses a plunger 46. Plunger 46 is slidably received within a bushing 48. A spring 50 biases plunger 46 rearwardly such that a chamfered head 52 of the plunger 46 is biased into a notch 54 in a spherical curved rear plate 56. Spherically curved rear plate 56 defines a spherical surface and is fixed to a rear housing member 58. Rear housing member 58 incorporates a mount to receive a cylinder housing portion 60 which extends to the forward housing member 38. Tie rods 62 connect the housing members 38 and 58 and hold cylinder 60.

An access opening 64 is formed through the cylinder 60 such that an operator will have access to the internal adjustment structure for adjusting the spring force of spring 50. As shown, a ring 66 is threadably received on threads 67 formed on an outer face of moving portion rear extension 44. As ring 66 is turned it moves either away from or towards spring 50. Ring 66 carries a rod 68 that moves against a spring compression member 70. Spring compression member 70 compresses or relaxes spring 50 to adjust the force from spring 50 on plunger 46. By turning ring 66, one can thus adjust the force from spring 50 holding plunger 46 in notch 54. Also, the angle of the tapers on head 52 and notch 54 control the overload force. Preferably, a head taper angle of 30 degrees is used.

As also shown, a sensor 55 is mounted adjacent to the end 52 of plunger 46. Sensor 55 may be any standard proximity sensor. As plunger 46 begins to move outwardly of notch 54, sensor 55 will sense that movement. Sensor 55 is preferably connected into a control for movement member 22, and upon sensing movement of the plunger 46, a signal may be sent to the control that an obstruction has been encountered by the tool. The control may then discontinue any further movement of the tool.

As shown in FIG. 3, the moving member 30 receives two trunnions 42, and the fixed plate 38 receives the other two trunnions 40. In this figure, the moving member 30 may pivot on the axis of trunnions 42 relative to the housing 32, and the entire moving member 30 and cross member 36 may also pivot along the axis of trunnions 40 relative to the fixed housing plate 38. Covers 71 may be screwed to the moving member 30 to secure trunnions 42.

As shown in FIG. 4, when the moving member 30 is pivoting on trunnions 42, slots 72 formed in the sides of moving member allow the trunnions 40 to remain in the housing plate 38, and yet accommodate the pivotal movement about the trunnions 42.

Figure 5:
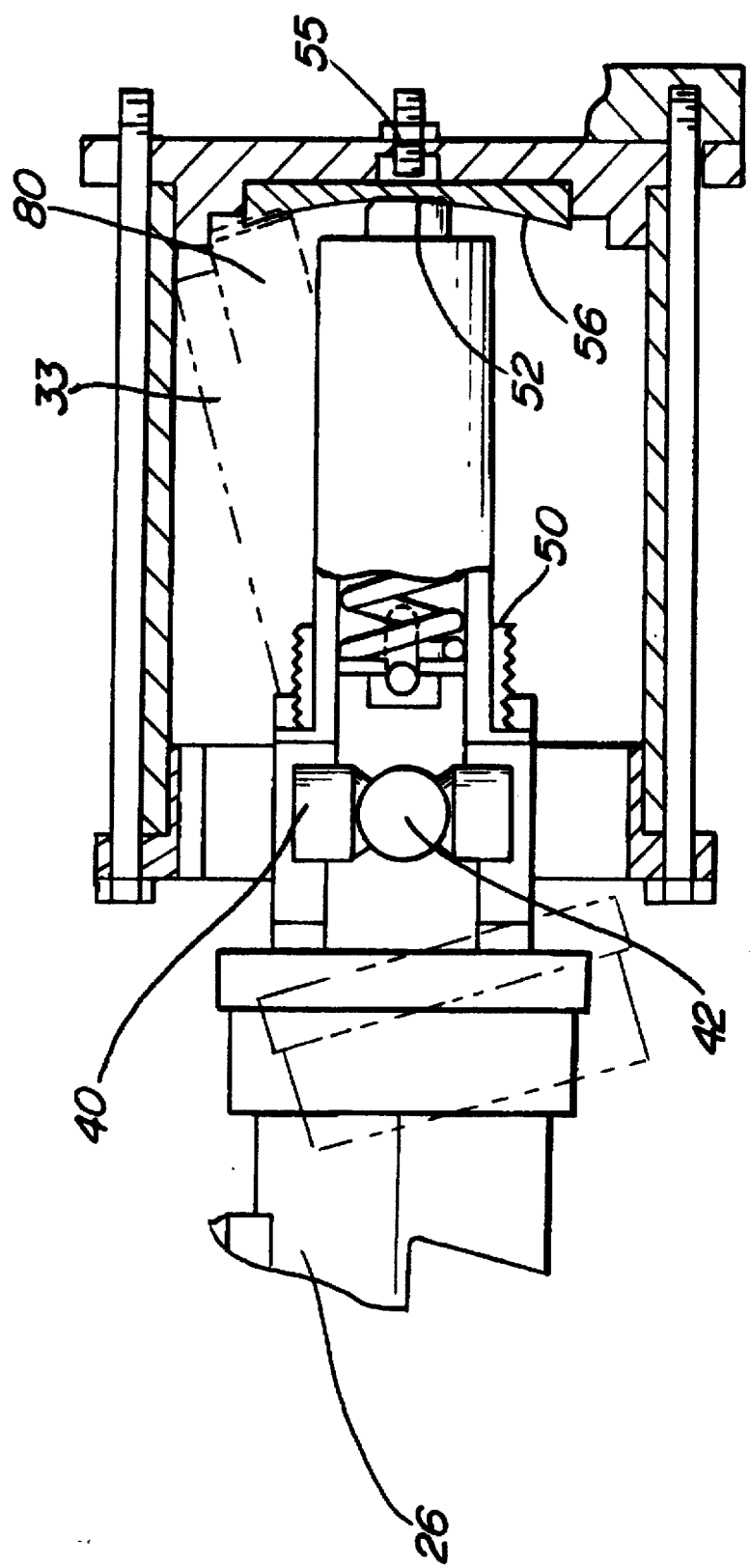
FIG. 5 shows the breakaway connection having been moved to a disabled position.

FIG. 5 shows the breakaway connection having allowed movement of the tool mount 26 away from its mounting position to a disabled position 33. Spring 50 is designed to provide a secure and adequate mount for the tool. Only breakaway overload forces of such a high order that they begin to approach a level likely to cause damage are sufficient to cause the breakaway shown in FIG. 5. As an example, breakaway forces on the order of 800 to 1,200 foot pounds may be designed into the system by adjusting the spring 50.

When a force is created by an obstruction encountering either tool 24, or workpiece carried by tool 24, hitting an obstruction, a moment arm force is seen at the connection between the head 52 of plunger 46 and the notch 54. That force creates an axial force component directly into the plunger 46 tending to cause movement of the plunger 46 to further compress spring 50. Spring 50 will resist this force and movement. If the moment arm force created at the interface between chamfered head 52 and notch 54 exceeds the force applied by spring 50, plunger 46 may move to the left as shown in FIG. 5 and out of notch 54. At that time, the tool may then move to the disabled position shown generally at 33. Plunger will ride on surface 56, as shown at 80. It should also be understood the universal movement of moving member 30 within housing 32 can also be into or out of the plane of FIG. 5. The tool is thus protected, and will not be damaged, or damage any parts that it may have been contacting.

As the plunger 46 begins to move, sensor 55 immediately senses such movement and communicates with a control for the movement member 22. Known sensors of the type available from Syron Engineering and Manufacturing Co. of Saline, Mich. are suitable for this function. As shown, there is a space between the sensor 55 and the chamfered end of the plunger 46 to allow accurate monitoring of the movement.

The spherical surface 56 is helpful in guiding the tool back to its locked position after it has broken away to the disabled position 80. When the tool has moved to its breakaway position, an operator merely grasps the tool and moves it generally toward a central position. The surface 56 will guide the chamfered head 52 back toward notch 54. Once the chamfered head 52 finds notch 54, the tool will snap back into its mount location easily and quickly.

FIG. 6 shows a ring 66 having a plurality of nibs 82 at a rear surface. Pairs of nibs 82 are spaced incrementally about a face of ring 66. Rod 68 is received within nibs 82 to provide an operator with incremental feedback of the amount of adjustment on the spring 50. As an example, the distance between adjacent nibs 82 may be selected such that when the rod 68 is received within an advanced set of nibs, the operator will know that the overload force has been adjusted by a predetermined foot pound incremental difference. There are holes 83 in the outer periphery to facilitate turning by a wrench.

As described above, this invention provides an operator with the ability to securely mount a tool, yet protect that tool. Moreover, once the breakaway has occurred, the operator is able to quickly and easily reset the tool.

While the breakaway connection 28 described above provides very beneficial protection to moment arm forces on the tool, it will not resist a force directly axially along the axis of moving member 30. The embodiments shown in FIGS. 6–8 may be incorporated into the breakaway connection 28 to provide protection against such an axial force.

FIG. 7 shows structure 89 for resisting an axial force directly on the tool 24. It should be noted that in general, the tool will never experience a pure and direct axial force. More typically, the axial force would be in combination with some moment arm. Thus, although provision is made for the axial force in the following embodiments, it should be understood that the breakaway connection in response to a moment arm force may also be actuated with the axial force structure about to be described.

A first housing 90 and a second housing 92 replace housing plate 38. Second housing 92 receives the trunnions 40 as described above. The second housing 92 is mounted on first housing 90 by a pair of pins 94. Second housing 92 may slide axially along pins 94 relative to first housing 90. As second housing 92 slides, it will compress the remainder of moving member 30 and spring 50 against the plunger 46 which is held in the rear plate 58 of the housing 32. Thus, the spring force 50 will act as a damper against the axial force, allowing the tool to move away from the axial force causing the obstruction. A sensor 93 monitors movement of second housing 92 and communicates with the control to stop further movement, as described above.

Figure 8:
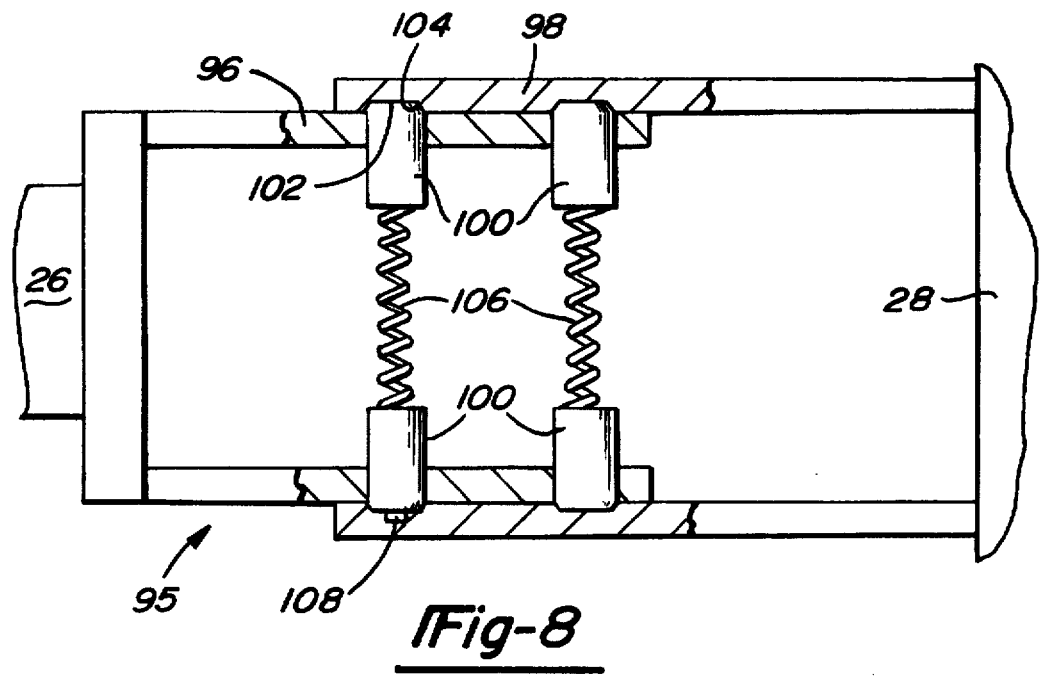
FIG. 8 is a view of a second embodiment allowing for axial movement.

FIG. 8 discloses a second embodiment 95 that may be mounted between the breakaway connection 28 and the tool mount 26. Breakaway connection 95 incorporates a pair of telescoping housing members 96 and 98. A plurality of plungers 100 including tampered heads 102 received in chamfered notches 104 connect the housing members 96 and 98. Springs 106 bias the plungers 100 into the notches 104. This structure is shown somewhat schematically. An axial force on the tool 26 is applied to the interface of chamfered head 102 and notch 104. The chamfered surfaces turn the axial force into plunger 100 and against spring 106. When the overload force of spring 106 is overcome, the plunger chamfered head 102 moves out of notch 104, and the housing member 96 may move telescopically relative to housing member 98 to a disabled position. This is a breakaway connection, and once the plungers have moved outwardly of the notches 104, the tool must be reset to its mount position. As also shown, a sensor 108 may be mounted adjacent one of the plungers to provide an indication to a control that the breakaway is occurring. The control may stop further movement when the breakaway is sensed.

Figure 9:
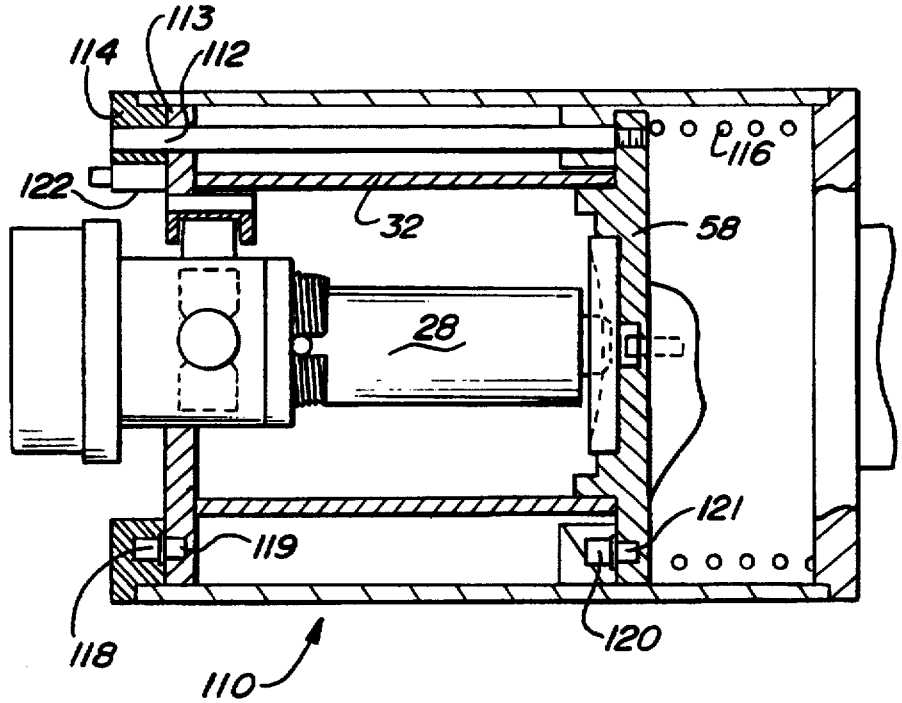
FIG. 9 is a view of a third embodiment allowing for axial movement.

FIG. 9 shows yet another embodiment 110 of the breakaway connection for overcoming an axial force along the axis of the moving member 30. In this embodiment, the entire breakaway connection 28 including housing member 32 is mounted on sliding rods 112. Sliding rods 112 are mounted within a fixed outer housing 114. A large spring 116 biases housing 132 forwardly relative to the outer housing 114. If an axial force is encountered on the tool, the entire tool and moment arm breakaway connection 28 may move to the right as shown in FIG. 9 against the force of spring 116.

In particular, positioning pins 118 have a tapered forward end received in notches 119 in a plate 113 that moves with housing 32. Similar pins 120 are received in notches 121 in rear plate 58. There are preferably two pins at each location. The four pins nest in the notches to provide a secure connection and eliminate play or looseness. The tapered forward ends guide housing 32 back to its mount location after an overload. A sensor 122 communicates with the control, as described above.

Preferred embodiments of this invention have been disclosed; however, a worker of ordinary skill in the art would recognize that certain modifications would come within the scope of this invention. For that reason, the following claims should be studied to determine the true scope and content of this invention.

We claim:

1. A system for moving a tool comprising:

a tool;

a robot arm;

a movement member operably connected to said tool for moving said tool;

a breakaway connection normally securely connecting said tool to said movement member, said breakaway connection having an axial overload force at which it allows said tool to move away from an obstruction to a disabled position, and out of its secure connection to said movement member;

said axial overload force is resisted by a breakaway connection responsive to axial forces, said breakaway connection including a pair of telescoping members, and a plurality of spring biased plungers received in notches in one of said telescoping members selectively securing said telescoping members, said spring biased plungers being moved against said spring by an axial force on said telescoping members and allowing said plungers to move out of said notches if said axial overload force is exceeded to allow said tube to move away from an axial force causing obstruction; and said plungers being received in said notches, and preventing any relative movement of said telescoping members until said axial overload force is exceeded.

2. A system as recited in claim 1, wherein a further breakaway connection is provided for resisting a moment arm force relative to an axis of said tool, said further breakaway connection being responsive to a moment overload force.

3. A system as recited in claim 2, wherein said tool must be reset from said disabled position after said tool has moved out of said secure connection.

4. A system as recited in claim 2, wherein said overload moment force is adjustable.

5. A system as recited in claim 2, wherein an electric sensor senses movement of said tool away from said secure connection and communicates with a control for said movement member that said tool has begun to move to its disabled position.

6. A system for moving a tool including:

a movement member;

a breakaway housing and a moving arm member normally securely connected, but selectively moveable relative to, said breakaway housing, said moving arm member being connected to one of a tool and said movement member said breakaway housing being connected to the other, one of said breakaway housing and said moving arm member carrying a selectively moveable lock member, said selectively moveable lock member being biased within an opening in the other of said breakaway housing and said moving arm member, and a force on said tool causing a force between said opening and said lock member, and when said force overcomes said bias on said lock member, said lock member moving out of said opening to allow said moving member to move relative to said breakaway housing;

said lock member being a spring biased plunger, a generally spherical surface surrounding said opening, such that said lock member is guided on said spherical surface when it moves out of said opening; and said moving arm member being mounted in a universal joint within said breakaway housing, said universal joint having a four trunion cross member, with two of said trunions mounted in said breakaway housing and two of said trunions being mounted in said arm member, said trunions mounted in said breakaway housing extending through slots in an outer wall of said moving arm member to allow said moving arm member to pivot on said trunions received in said moving arm member.

7. A system as recited in claim 6, wherein said lock member is a spring biased plunger having a chamfered lock face received within a chamfered face of said opening, said chamfered faces of said plunger and said opening turning a moment force on the tool into an axial force on said plunger and against said spring holding said plunger in said opening.

8. A system as recited in claim 7, wherein a ring is provided that may be turned to compress or relax said spring to adjust said spring force.

9. A system as recited in claim 8, wherein said ring includes a plurality of incrementally spaced position locators, and said ring moves a compression member, said compression member not rotating with said ring, but being moved axially to further compress or relax said spring, and said incrementally spaced position locators receiving said compression member for providing an operator with feedback of the incremental amount of adjustment of compression of said spring by turning said ring.

10. A system as recited in claim 6, wherein a sensor monitors movement of said lock member to provide a signal of said moving member beginning to move.

11. A system as recited in claim 6, wherein said universal joint connection being positioned intermediate said tool and said lock member such that said tool can pivot on said universal joint connection when said lock member has moved out of said opening, with the movement of said lock member on said spherical surface guiding the relative movement of said tool.

12. A system for moving a tool including:

a movement member;

a breakaway housing and a moving arm member normally securely connected, but selectively moveable relative to, said breakaway housing, said moving arm member being connected to one of a tool and said movement member said breakaway housing being connected to the other, one of said breakaway housing and said moving arm member carrying a selectively moveable lock member, said selectively moveable lock member being biased within an opening in the other of said breakaway housing and said moving arm member, and a force on said tool causing a force between said opening and said lock member, and when said force overcomes said bias on said lock member, said lock member moving out of said opening to allow said moving member to move relative to said breakaway housing;

said lock member being a spring biased plunger having a chamfered lock face received within a chamfered face of said opening, said chamfered faces of said plunger and said opening turning a moment force on the tool into an axial force on said plunger and against said spring holding said plunger in said opening, said moving member being mounted in a universal joint having a four trunion cross member relative to said breakaway housing; and said breakaway connection also is operable to resist an axial force on said tool, said axial force resistance being provided between an outer housing and said breakaway housing.

13. A system as recited in claim 12, wherein a spring biasing said breakaway housing relative to said outer housing, and an axial force causing said breakaway housing to compress said spring and move relative to said outer housing.

14. A system as recited in claim 12, wherein said axial force is resisted by a separate breakaway connection responsive to axial forces, said separate breakaway connection including a pair of telescoping members, and a plurality of spring biased plungers received in notches in one of said telescoping members, selectively securing said telescoping members, said spring biased plungers being moved against said spring by an axial force on said telescoping members and allowing said plungers to move out of said notches to allow said tool to move away from an axial force causing obstruction.

15. A system as recited in claim 12, wherein said breakaway housing is received on pins relative to an outer housing, and said breakaway housing is slidable relative to said outer housing in response to an axial force on said tool.

16. A system as recited in claim 15, wherein said moving member and said breakaway housing are connected by a four-trunnion universal joint, with two of said trunnions received in said breakaway housing, and being slidable with said breakaway housing.

* * * * *